US011135570B2

(12) United States Patent
Becker et al.

(10) Patent No.: US 11,135,570 B2
(45) Date of Patent: Oct. 5, 2021

(54) PROCESS FOR REDUCING THE SULPHUR CONTENT OF ANATASE TITANIA AND THE SO-OBTAINED PRODUCT

(71) Applicant: VENATOR GERMANY GMBH, Duisburg (DE)

(72) Inventors: Ralf Becker, Bottrop (DE); Regina Optehostert, Moers (DE); Rolf Wittenberg, Neukirchen-Vluyn (DE)

(73) Assignee: VENATOR GERMANY GMBH, Duisburg (DE)

( * ) Notice: Subject to any disclaimer, the term of this patent is extended or adjusted under 35 U.S.C. 154(b) by 141 days.

(21) Appl. No.: 16/306,903

(22) PCT Filed: Jun. 2, 2017

(86) PCT No.: PCT/EP2017/063439
§ 371 (c)(1),
(2) Date: Dec. 4, 2018

(87) PCT Pub. No.: WO2017/211710
PCT Pub. Date: Dec. 14, 2017

(65) Prior Publication Data
US 2020/0306727 A1 Oct. 1, 2020

Related U.S. Application Data

(63) Continuation of application No. 15/173,801, filed on Jun. 6, 2016, now abandoned.

(30) Foreign Application Priority Data

Jun. 6, 2016 (DE) .................. 10 2016 110 372.1

(51) Int. Cl.
*B01J 21/06* (2006.01)
*B01J 21/08* (2006.01)
*B01J 37/03* (2006.01)
*C10G 2/00* (2006.01)
*B01J 23/26* (2006.01)
*B01J 37/08* (2006.01)

(52) U.S. Cl.
CPC ............. *B01J 21/063* (2013.01); *B01J 21/08* (2013.01); *B01J 23/26* (2013.01); *B01J 37/031* (2013.01); *B01J 37/08* (2013.01); *C10G 2/33* (2013.01)

(58) Field of Classification Search
CPC ........ B01J 21/063; B01J 21/08; B01J 37/031; B01J 37/08; B01J 23/26; C10G 2/33
See application file for complete search history.

(56) References Cited

U.S. PATENT DOCUMENTS

| 5,169,821 | A | 12/1992 | Soled et al. |
| 5,330,953 | A | 7/1994 | Meina |
| 5,362,908 | A | 11/1994 | Schroeder et al. |
| 7,807,605 | B2 | 10/2010 | Gesenhues et al. |
| 8,173,098 | B2 | 5/2012 | Morita et al. |
| 8,758,501 | B2 | 6/2014 | Pfluecker et al. |
| 2006/0194057 | A1 | 8/2006 | Pfluecker et al. |
| 2007/0231280 | A1 | 10/2007 | Schumacher et al. |
| 2009/0186953 | A1 | 7/2009 | Gesenhues et al. |
| 2013/0153467 | A1 | 6/2013 | Seki et al. |

FOREIGN PATENT DOCUMENTS

| DE | 103 33 029 A1 | 2/2005 |
| GB | 1168136 | 10/1969 |
| GB | 2 267 905 A | 12/1993 |
| WO | WO 94/20447 A1 | 9/1994 |

OTHER PUBLICATIONS

Zheleznov et al., "Effect of ZrO2 on the structure of ZrO2/TiO2/SiO2 Nanocomposites Fabricated By a Template Sol-Gel Method," Journal of Applied Spectroscopy, vol. 81, No. 6, Jan. 2015, pp. 983-989 (Year: 2015).*
Neppolian et al., "Synthesis and characterization of ZrO2-TiO2 binary oxide semiconductor nanoparticles: Application and interparticle electron transfer process," Applied Catalysis A: General 333 (2007) 264-271. (Year: 2007).*
Yamaguchi et al., "Formation and Transformation of TiO2 [Anatase] Solid Solution in the System TiO2-Al2O3," J. Am. Ceram. Soc., 72 (2) 330-33 (1989). (Year: 1989).*
Reidy et al., "Preparation of a highly thermally stable titania anatase phase by addition of mixed zirconia and silica dopants," Ceramic International 32 (2006) 235-239. (Year: 2006).*
D. A. H. Hanaor et al.: "Review of the anatase to rutile phase transformation", J Mater Sci, vol. 46, pp. 855-874 (2011).

* cited by examiner

*Primary Examiner* — Anthony J Zimmer
(74) *Attorney, Agent, or Firm* — Norman B. Thot

(57) ABSTRACT

An anatase titanium dioxide includes at least one compound selected from oxides of Si, Al, and Zr in an amount of 2-50% b.w., calculated as oxides, of a total weight of the oxides, and a sulfur content of less than 150 ppm based on the total weight of the oxides.

5 Claims, No Drawings

PROCESS FOR REDUCING THE SULPHUR CONTENT OF ANATASE TITANIA AND THE SO-OBTAINED PRODUCT

CROSS REFERENCE TO PRIOR APPLICATIONS

This application is a U.S. National Phase application under 35 U.S.C. § 371 of International Application No. PCT/EP2017/063439, filed on Jun. 2, 2017 and which claims benefit to German Patent Application No. 10 2016 110 372.1, filed on Jun. 6, 2016, and to U.S. patent application Ser. No. 15/173,801, filed on Jun. 6, 2016. The International Application was published in English on Dec. 14, 2017 as WO 2017/211710 A1 under PCT Article 21(2).

FIELD

The present invention relates to the field of heterogeneous catalysis. In more detail, the present invention relates to a process for reducing the sulfur content of stabilized anatase titania, the so-obtained catalytic support materials, and the use thereof for manufacturing heterogeneous catalysts.

BACKGROUND

Titanium dioxide is a well-known material for the manufacturing of heterogeneous catalysts. Titanium dioxide finds widespread application either as the catalytic material (for example, Claus catalysis) or as a catalytic support (for example, selective catalytic reduction of nitrous oxides, Fischer-Tropsch).

The predominant and in most cases preferred polymorph for heterogeneous catalysis is the anatase crystal phase. The large industrial scale manufacturing of anatase type $TiO_2$ relies on the so-called sulfate process in which titanium rich raw materials (ilmenite or Ti-slag) are first reacted with concentrated sulfuric acid to form $TiOSO_4$. Upon hydrolysis, a fine particulate anatase type $TiO_2$ with a high water content is obtained, a so-called metatitanic acid with the general formula $TiO(OH)_2$. A pure anatase $TiO_2$ can be obtained following further purification steps which include reduction and washing procedures.

The other large scale manufacturing process for $TiO_2$ is the so-called chloride process which uses a raw material with very high Ti content (natural or synthetic rutile or Ti-slag), chlorine and carbon to produce, in a first step, $TiCl_4$ which can easily be purified by distillation. A pure rutile $TiO_2$ is obtained upon burning in an oxygen rich flame. A pure anatase $TiO_2$ polymorph cannot be produced via this method.

Another process for the manufacturing of anatase type $TiO_2$ is the flame hydrolysis of $TiCl_4$ yielding a mixture of rutile and anatase only.

The performance of heterogeneous catalysts often depends on purity. Stray ions can affect the overall conversion of the catalytic process and/or the selectivity. Typical unwanted impurities are phosphorous, sulfur, heavy metals, alkaline and alkaline earth metals.

The Fischer-Tropsch synthesis of hydrocarbons from syngas (mixture of CO and $H_2$) is, for example, very sensitive towards sulfur impurities since the sulfur reacts with the catalytically active cobalt to form cobalt sulfides ($Co_xS_y$) which in turn lead to drastically reduced catalytic performance. Typical sulfur levels of FT-catalysts are below 150 ppm, for example, below 100 ppm. The major impurity in the sulfuric acid process generated anatase $TiO_2$ is sulfur stemming from adherent sulfuric acid of the manufacturing process. Other stray ion impurities are in the one or low two digit ppm range and are typically uncritical.

The performance of heterogeneous catalysts also depends on physical properties. A very good dispersion of the catalytically active material on the support is often a prerequisite to observing high conversions. Typically large specific surface areas of the support are important to provide maximum dispersion of the catalytically active centers.

There is therefore a need for large scale industrial availability of anatase type $TiO_2$ for catalytic applications that exhibits both:

i) a large specific surface area (BET>40 $m^2/g$); and ii) a low sulfur level (<150 ppm S).

From a manufacturing point of view, the sole large industrial scale and thus cost effective manufacturing process of anatase type $TiO_2$ is the sulfate process. Major drawbacks of this process is the large sulfur content in the final product which is known to be detrimental for many catalytic applications. A process must therefore be found that allows for the large industrial scale production of an anatase type $TiO_2$ with high specific surface area (>40 $m^2/g$) and a low amount of sulfur (<150 ppm S).

Several techniques have been developed to reduce the sulfur level in anatase type $TiO_2$ from the sulfate process. The most common is washing with water. The sulfate containing anatase $TiO_2$ is thereby typically suspended in water and washed over a filter medium (for example, a filter press). The washing is performed with cold or, for example, hot de-ionized water. The minimum sulfur levels that can be obtained by this process are in the range of 0.1-0.5 wt.-%.

Reacting the excess sulfuric acid with an appropriate base (NaOH, aqueous ammonia solution etc.) and removing the salts formed by excessive washing with de-ionized water allows for significant lower sulfur levels of 0.03-0.2 wt.-%. A certain risk of contamination exists, especially when using basic solutions of metals (for example, NaOH or KOH), since metal ions are only hardly washed out of the anatase when using an excess amount of base in order to obtain lowest sulfate levels.

Lowering the sulfur level can also be performed by successive washing cycles via the excess treatment with a strong base and successive removal of the metal ions by washing with an acid. In is in this case preferred to use acids (for example, acetic acid) that can easily be removed either during the washing or during a potential subsequent heating step.

During manufacturing of pigmentary grade titanium dioxide, the sulfur is removed by thermal decomposition of the sulfuric acid. A significant reduction of sulfate contamination is observed at temperatures exceeding 500° C., however, two processes also take place during this heat treatment: i) the $TiO_2$ particles undergo a particle growth which results in a significant and irreversible decrease of the specific surface area; and, ii) the phase transformation from the anatase to the rutile polymorph takes place at these temperatures. Both processes are desired in order to obtain pigmentary $TiO_2$ which typically has a low BET (<20 $m^2/g$) and rutile type $TiO_2$, but the processes prevent this procedure from being used for large surface area, low sulfur anatase $TiO_2$ out of the sulfate manufacturing process.

No process is therefore available that allows for the production of an anatase type $TiO_2$ via a large industrial scale production that exhibits the following properties:

1. An ultra-low sulfur content (<150 ppm);
2. A BET surface area >20 m²/g, for example, >30 m²/g and, for example, >40 m²/g; and
3. TiO$_2$ in the pure anatase phase.

SUMMARY

An aspect of the present invention is to provide a low sulfur anatase type catalytic support material with a high specific surface area that is easily accessible through large scale industrial processes.

In an embodiment, the present invention provides an anatase titanium dioxide which includes at least one compound selected from oxides of Si, Al, and Zr in an amount of 2-50% b.w., calculated as oxides, of a total weight of the oxides, and a sulfur content of less than 150 ppm based on the total weight of the oxides.

DETAILED DESCRIPTION

It has surprisingly been found that anatase type titanium dioxide doped with the appropriate amount of silica and/or an oxide of zirconium, and or an oxide of aluminum can be treated at temperatures high enough to decompose the sulfuric acid while maintaining substantially large specific surface areas. In this context, the term "thermal stabilization" means that anatase type TiO$_2$ is stabilized so that: i) the rutilization temperature is shifted towards higher temperatures; and, ii) the tendency towards BET loss is reduced.

In a typical experiment according to the present invention, anatase type TiO$_2$ having a content of 8 wt.-% SiO$_2$ is heated for one hour to temperatures as high as 1000° C. The resulting powder exhibits BET surface areas of about 50-70 m²/g and residual sulfur contaminations of <50 ppm. The degree of resistance towards thermal aging of the anatase is strongly dependent on the amount of silica added. Small amounts only introduce a minor resistance, while larger amounts of silica have a strong effect on aging properties.

Besides this effect, silica can also influence the catalytic properties of the final catalyst. It can change the overall performance by altering the selectivity and/or the conversion rate. Depending on the specific application and its specific demands concerning BET surface area, SiO$_2$ and the residual S-content, the right material and calcination conditions must be individually adjusted to the respective intended use. High calcination temperatures generally reduce both residual S-levels and specific surface area.

Basically any element that is able to stabilize the anatase polymorph can be used in terms of the present invention. Among numerous others typical elements for catalytic applications are Si, Al, Zr [J Mater Sci (2011) 46:855-874].

The incorporation of such stabilizing elements can be achieved by a variety of different synthetic approaches. The following different methods are suitable for the inventive material:

1. Precipitation of SiO$_2$ onto TiO$_2$;
2. Co-precipitation or co-hydrolysis of TiO$_2$ and SiO$_2$;
3. Mixing of TiO$_2$ sols and SiO$_2$ sols;
4. Treating of TiO$_2$ with SiO$_2$ sols;
5. Treating of TiO$_2$ with an SiO$_2$ precursor to subsequently form SiO$_2$ via hydrolysis and/or oxidation; and
6. Mixing TiO$_2$ and SiO$_2$.

The present invention is thus directed to an anatase titanium dioxide having a content of at least one compound selected from oxides of Si, Al, and Zr in an amount of 2-50% b.w., for example, 2-30% b.w., calculated as oxides, of the total weight of the oxides, and having a sulfur content of less than 150 ppm, for example, less than 100 ppm and, for example, less than 80 ppm, referred to the total weight of the oxides.

The inventive anatase material can, for example, have an alkali content such as of Na$^+$ of below 200 ppm, for example, below 100 ppm, in order to avoid any negative influences of the alkali on the stability of the material during use.

According to the present invention, the anatase titanium dioxide can, for example, be obtained by the sulfate process which is obtained as titanium dioxide and hydrated forms thereof including meta-titanic acid. Meta-titanic acid and the hydrated forms of titania which are used here synonymously can be represented by the formula TiO$_{(2-x)}$(OH)$_{2x}$ with 0≤x≤1, including also titania. Said meta-titanic acid is then further treated to incorporate the stabilizing agents selected from Si, Zr and/or Al in the form of the oxides and hydrated forms thereof and then subjected to the calcination treatment to decompose the sulfur-containing compound such as sulfuric acid as a remainder of the sulfate process. During calcination, the hydrated forms are converted to the oxides and the hydrate content are reduced to zero, which should be clear to a person skilled in the art.

The term "anatase titanium dioxide" or "anatase titania" as used in accordance with the present invention means that at least 95% b.w., for example, 98% b.w., and, for example, 100% of the titania is present in the anatase form. The anatase phase generally has crystallite sizes of 5-50 nm. For the inventive material, the crystalline phases of the particles are thus mostly present in the anatase phase after drying at 105° C. for at least 120 minutes before calcination, and also after calcination due to the stabilization. In other words, after subtracting the linear base, the ratio of the height of the most intensive peak of the anatase structure (reflex (101)) to the height of the most intensive peak of the rutile structure (reflex (110)) is at least 5:1, for example, at least 10:1. The XRD analysis can, for example, exclusively show anatase peaks. An X-ray is taken to determine the phase and crystallite size by Scherrer, in particular the crystal modification (phase identification). The intensities of the Bragg condition after diffracted at the lattice planes of a crystal X-rays are thereby measured against the diffraction angle 2 Theta therefor. The X-ray diffraction is characteristic for the phase.

"Drying" as used in the context of the present invention means drying at temperatures above 105° C. at ambient pressure. All large scale industrial techniques can be applied such as spin-flash or spray drying, but the drying is not limited to these techniques.

"Calcining" as used in accordance with the present invention means treating the stabilized anatase titania at an elevated temperature from above 500° C., for example, from 800° C. up to 1200° C., for a time period sufficient to decompose the remaining sulfur containing compound such as sulfuric acid and to thus reduce the sulfur content to a level below 150 ppm, for example, to less than 100 ppm and, for example, to less than 80 ppm referred to the total weight of the oxides, for example, for a time period of 30-1200 minutes, while maintaining the titania in the anatase form. Calcining can be carried out in a regular calcination device under atmospheric pressure so that the sulfur containing components can evaporate from the material.

The weight ratios, ppm-values, or percentages as used in the present invention refer to the weight of the material after calcination.

Due to the high temperature treatment, agglomeration can take place which can be detrimental for the subsequent processes for forming a catalyst. De-agglomeration of the calcined material by milling may thus be necessary. Both wet or dry milling techniques can be applied and typical techniques include ball or jet milling. An optional sieving step to provide removal of coarse particles can follow.

The anatase $TiO_2$ obtained can then serve as a catalytic support material which can further be treated with at least one compound of catalytically active metal selected from Co, Ni, Fe, W, V, Cr, Mo, Ce, Ag, Au, Pt, Pd, Ru, Rh, Cu, or mixtures thereof, whereby a metal loaded material is obtained. A precursor compound soluble in polar or non-polar solvents of a catalytically active metal selected from Co, Ni, Fe, W, V, Cr, Mo, Ce, Ag, Au, Pt, Pd, Ru, Rh, Cu, or mixtures thereof can be used. Treating the support material with one precursor compound or mixtures thereof of the catalytically active metals can be performed by various techniques. Typical methods include incipient wetness or excess solvent method. Deposition reactions such as hydrolysis can also be applied to bring the catalytically active metal or precursors thereof into contact with the catalytic support material. The compound of a catalytically active metal which are not particularly limited and may be selected from Co, Ni, Fe, W, V, Cr, Mo, Ce, Ag, Au, Pt, Pd, Ru, Rh, Cu, or mixtures thereof, can be used in an amount to obtain a loading of 1-50% b.w, for example, 5-30% b.w., and, for example, 8-20% b.w., calculated as oxides of the total weight of the final material.

The present invention thus includes:

Anatase titanium dioxide having a content of at least one compound selected from oxides of Si, Al, and Zr in an amount of 2-50% b.w., for example, 2-30% b.w., calculated as oxides, of the total weight of the oxides, and having a sulfur content of less than 150 ppm, for example, less than 100 ppm and, for example, less than 80 ppm, referred to the total weight of the oxides;

Anatase titanium dioxide having a content of at least one compound selected from oxides of Si, Al, and Zr in an amount of 3-20% b.w., for example, 4-12% b.w., calculated as oxides, of the total weight of the oxides and having a sulfur content of less than 150 ppm, for example, less than 100 ppm and, for example, less than 80 ppm referred to the total weight of the oxides;

Anatase titanium dioxide having a content of $SiO_2$ in an amount of 2-30% b.w., for example, 3-20% b.w., for example, 4-12% b.w., calculated as oxide, of the total weight of the oxides, and having a sulfur content of less than 100 ppm, for example, less than 80 ppm referred to the total weight of the oxides;

and a:

Process for preparing the inventive anatase titanium dioxide having a content of at least one compound selected from oxides of Si, Al, and Zr in an amount of 2-50% b.w., for example, 2-30% b.w., for example, 3-20% b.w., for example, 4-12% b.w., calculated as oxides, of the total weight of the oxides, and having a sulfur content of less than 150 ppm, for example, less than 100 ppm and, for example, less than 80 ppm, referred to the total weight of the oxides, wherein:

a titanium compound selected from metatitanic acid or titanylsulphate is mixed with at least one compound selected from oxides and/or hydroxides of Si, Al, and Zr or precursors thereof in an aqueous medium, precipitating at least one compound selected from oxides and/or hydroxides of Si, Al, and Zr, treating the obtained product to reduce the alkali content thereof if the alkali content is above 200 ppm, to a level of at most 200 ppm, referred to the total weight of the oxides, optionally filtering, optionally washing with water, and optionally drying the product, the product is then subjected to a calcination treatment at a temperature of more than 500° C., for example, in the range of 800-1200° C., over a time period sufficient to decompose the remaining sulfur containing compound such as sulfuric acid to a level below 150 ppm, for example, less than 100 ppm and, for example, less than 80 ppm referred to the total weight of the oxides, for example, over a time period of 0.5 to twelve hours;

Process for preparing an embodiment of the inventive anatase titanium dioxide wherein metatitanic acid is mixed with a $SiO_2$ precursor compound, precipitating at least one oxide and/or hydroxide of Si, treating the obtained product to reduce the alkali content thereof if the alkali content is above 200 ppm, to a level of at most 200 ppm, referred to the total weight of the oxides, optionally filtering, optionally washing the obtained product and optionally drying the obtained product, subjecting the product to a calcination treatment at a temperature of more than 500° C., for example in the range of 800-1200° C., over a time period sufficient to decompose the remaining sulfur containing compound such as sulfuric acid to a level below 100 ppm, for example, less than 80 ppm referred to the total weight of the oxides, for example, over a time period of 0.5 to twelve hours;

Process for preparing an anatase titanium dioxide wherein a titanium compound selected from a $TiO_2$ sol is mixed with an $SiO_2$ sol, adjusting the pH to obtain a precipitate, treating the obtained precipitate to reduce the alkali content if the alkali content is above 200 ppm referred to the total weight of the oxides, to a level of at most 200 ppm, referred to the total weight of the oxides, the obtained product is optionally filtered, optionally washed, optionally dried, and the obtained product is subjected to a calcination treatment at a temperature of more than 500° C., for example, in the range of 800-1200° C., over a time period sufficient to decompose the remaining sulfur containing compound such as sulfuric acid to a level below 150 ppm, for example, less than 100 ppm and, for example, less than 80 ppm referred to the total weight of the oxides, for example, in the range of 800-1200° C., for example, over a time period of 0.5 to twelve hours;

Process for reducing the sulfur content of a stabilized anatase titania wherein an anatase titania having a content of a stabilizing agent is treated at a temperature more than 500° C., for example, in the range of 800-1200° C., over a time period sufficient to decompose a remaining sulfur containing compound such as sulfuric acid to a level below 150 ppm, for example, less than 100 ppm and, for example, less than 80 ppm referred to the total weight of the oxides, for example, for a time period of at least 30 minutes, wherein the stabilizing agent is selected from oxides of Si, Al, and Zr, and wherein the content of the stabilizing agent is in the range of 2-50% b.w., for example, 2-30% b.w., calculated as oxides, of the total weight of the oxides;

Use of a calcination treatment at a temperature more than 500° C. for reducing the sulfur content of a stabilized anatase titania having a content of at least one compound selected from oxides of Si, Al, and Zr in an amount of 2-50% b.w., for example, 2-30% b.w., calculated as oxides, of the total weight of the oxides, to a level below 150 ppm, for example, less than 100 ppm and, for example, less than 80 ppm referred to the total weight of the oxides;

Use of the anatase titanium dioxide of the present invention, obtainable according to the inventive processes, as a catalyst or catalyst support in catalysis reactions, gas-to-liquid reactions such as in particular Fischer-Tropsch catalysis, selective catalytic reduction (SCR), oxidation catalysis, photo catalysis, hydrotreating catalysis, Claus catalysis, phthalic acid catalysis; and A catalyst or a catalyst support, comprising the anatase titanium dioxide of the present invention, obtainable according to the inventive processes.

The present invention is further illustrated by the following Examples and Comparative Examples.

Experimental Part

Analytical Methods

Determination of $TiO_2$ Polymorph

An x-ray diffraction (XRD) analysis is applied to determine the $TiO_2$ polymorph. This is done in a typical XRD set-up where the intensities of the diffracted x-rays are measured against the diffraction angle 2 Theta. The evaluation of the XRD pattern is performed using the JCPDS-data base. Typical condition of analysis are: 2 Theta=1070°, steps of 2 Theta=0.02°, measuring time per step: 1.2 seconds.

Determination of $SiO_2$ Content

The material is digested in $H_2SO_4/(NH_4)_2SO_4$, followed by dilution with de-ionized water. The residue is washed with sulfuric acid, and the $SiO_2$ content is obtained by weighing the filter cake after incineration.

Determination of $TiO_2$ Content

Digestion of the material is performed with $H_2SO_4/(NH_4)_2SO_4$ or $KHSO_4$. Reduction of the $Ti^{4+}$ is performed with Al to $Ti^{3+}$, and the $TiO_2$ content is finally obtained by titration with ammonia iron-III-sulfate (using $NH_4SCN$ as an indicator).

Determination of S-Content

S-contents were obtained by the elemental analyzer Euro EA (Hekatech). The sample is burned in an oxygen atmosphere, and the gases are analyzed by gas chromatography. S-contents are calculated from the areas of the chromatogram.

Determination of Specific Surface Area

The specific surface area was determined by nitrogen adsorption technique according to DIN ISO 9277 (BET method). Five (5) points between 0.1 and 0.3 $p/p_0$ were evaluated. The equipment used was an Autosorb® 6 or 6B (Quantachrome GmbH).

EXAMPLE 1

$SiO_2$ (13.1% b.w.) was introduced by co-precipitation of $TiO_2$ and $SiO_2$ from $TiOSO_4$— and $Na_2SiO_3$-solutions. 352 l of $Na_2SiO_3$ (94 g/l $SiO_2$) solution and 2220 l of $TiOSO_4$ (103 g/l $TiO_2$) solution were simultaneously pumped over a period of 270 minutes into a stirred reaction vessel containing 960 l water. During the reaction, the pH was maintained at 5 with an ammonia solution. After the addition was complete, the reaction was heated for 1 hour to 75° C. to complete the reaction. A hydrothermal aging was then performed for 4 hours at 9.5-10 bar and 170-180° C. The resulting reaction mixtures was then filtered and washed with de-ionized water. The product was obtained after spray drying at 350° C. The BET was 100 m²/g, and the S content 4000 ppm.

EXAMPLE 2

A $SiO_2/TiO_2$ powder having a $SiO_2$ content of 8.5% b.w. was prepared on the basis of metatitanic acid and $Na_2SiO_3$ following a sequence of pH-adjusting steps and final filtration and washing of the so-obtained material with de-ionized water. The $SiO_2/TiO_2$ powder obtained after drying had a BET of 334 m²/g and a sulfur content of 1100 mg/kg.

EXAMPLE 3

943 g metatitanic acid (29.2% b.w. $TiO_2$) were diluted with deionized water to 150 g/L. 78.5 g $ZrOCl_2 \cdot 8H_2O$ were added and the temperature was raised to 50° C. 68 mL sodium silicate ($Na_2SiO_3$, 358 g/L $SiO_2$) were then added. After addition was completed, aqueous NaOH (50% b.w. NaOH) was added until a pH of 5.25 at 50° C. was reached. The white precipitate was filtered and washed with deionized water until the conductivity of the filtrate was below 100 µS/cm. The remaining filter cake was dried at 105° C. The BET-surface area of the product was 329 m²/g and S>1000 ppm. $SiO_2$ and $ZrO_2$ contents were 7.7% and 10.8% b.w., respectively.

EXAMPLE 4

Example 4 was produced in the same way as Example 3 except that the sequence of $ZrOCl_2 \cdot 8H_2O$ and sodium silicate addition was changed. For Example 4, first the $Na_2SiO_3$ solution and then the $ZrOCl_2 \cdot 8H_2O$ was added. $SiO_2$ and $ZrO_2$ contents were 6.8% and 10.4% b.w., respectively. The BET-surface was 302 m²/g, and S-content was 3300 ppm.

COMPARATIVE EXAMPLE 1

Hombikat 8602 (commercial product). BET surface area was 321 m²/g and S content 4700 ppm.

COMPARATIVE EXAMPLE 2

Commercially available Hombikat 8602 was purified by neutralization with NaOH and washing with deionized water. The resulting sulfur content before calcination was 0.2 wt.-% (2000 ppm), and the BET-surface area 351 m²/g.

COMPARATIVE EXAMPLE 3

A rutile suspension was prepared according to Example 1a in DE 10333029 A1. NaOH was added thereto until a pH of 6.0 to 6.2 at 60° C. was obtained. The solid was then filtered and washed with deionized water to a filtrate conductivity of below 100 µS/cm. The obtained filter cake was re-slurried and spray dried. The BET surface area was 105 m²/g, and the S-content 70 ppm.

COMPARATIVE EXAMPLE 4

Commercially available Aerosil® P25 from Evonik was used as received. The BET surface area was 55 m²/g, and S <30 ppm.

COMPARATIVE EXAMPLE 5

300 ml Titaniumoxychloride (145 g/L $TiO_2$) solution was diluted with de-ionized water to 3 L. 4 g oxalic acid dihydrate were then added and a white solid was deposited by treating the reaction mixture with aqueous 15% NaOH solution while maintaining the temperature below 20° C. The final pH was 6.2. After filtration, the white solid was washed with de-ionized water to a filtrate conductivity <100

µS/cm. Re-slurrying and spray drying gave the final product with a BET of 359 m²/g and S<30 ppm.

Calcination

All calcinations were conducted in a muffle kiln. The materials were placed into ceramic seggars (corundum) and heated for 1 hour at 1000° C. The resulting powders were carefully grinded and homogenized prior to XRD, BET and SO₄ analyses. The BET surface areas and sulfur contents of various SiO₂-treated TiO₂ anatase supports before and after aging for 1 hour at 1000° C. are shown in Table 1.

Fischer Tropsch Synthesis (FTS):

The FTS test were conducted using a 32-fold parallel reactor. The powders were compacted and subsequently crushed. The samples were lowed with Co(NO₃)₂ via impregnation in order to obtain a final Co loading of 10 wt.-% based on the total weight of the dried and reduced catalyst. For catalytic testing, the 125-160 µm fraction was used and each catalyst unit was filled with an amount of catalyst to provide 40 mg Co-metal loading. Prior to the catalytic testing, the catalyst was activated in diluted H₂ (25% in Ar) at 350° C. (1K/min heating ramp). The catalytic testing was then performed at 20 bar with a feed of 1.56 L/h per reactor. The H₂/CO ratio was 2 (10% Ar in feed) and the temperature of the catalytic test was 220° C.

In Fischer Tropsch synthesis, CO and H₂ are contacted at elevated pressure and temperature to react to hydrocarbons. Evonik P25 is a known TiO₂ based catalytic support for this application. In order to have an overall economic FTS process, the catalysts must fulfil the properties:

1. High CO conversion ($X_{CO}$ in %);
2. High $C_{5+}$ productivity ($P_{C_{5+}}$ in $g_{C_{5+}}/(g_{C_o}h)$);
3. Low methane selectivity ($S_{CH_4}$ in %); and
4. Low CO₂ selectivity ($S_{CO_2}$ in %).

The target of FTS is to produce long chain hydrocarbons. Especially hydrocarbons with more than 5 carbon atoms are of interest because they serve as a feedstock, for example, for high quality Diesel, kerosene or long chain waxes. Syngas (H₂/CO-mixtures) is often produced from methane by reacting it with H₂O to yield CO and H₂ (steam reforming). The reverse reaction would reduce the amount of CO and H₂ available for the FTS reaction. High CH₄ selectivity in FTS indicates high conversion of CO and H₂ to CH₄ and vice versa. The CH₄ selectivity should therefore be maintained at the lowest level possible. Under the reaction conditions, CO can additionally react with H₂O to form CO₂ and H₂ (water gas shift reaction). This would reduce the concentration of carbon atoms available for the FTS. High CO₂ selectivity indicates high conversion of CO to CO₂ and vice versa. CO₂ selectivity should thus be low for FTS catalysts.

CO conversion (the amount of CO converted) should also be high and the amount of hydrocarbons with more than 5 carbon atoms should also be high. The latter parameter is indicated by the amount of hydrocarbons with more than 5 carbon atoms produced within one hour over one gram of Cobalt metal.

With respect to all these four parameters, Table 3 clearly shows that the inventive products exhibit superior properties when used as catalytic supports in FTS.

TABLE 1

| Sample | BET m²/g | S mg/kg | TiO₂ Polymorph | BET m²/g | S mg/kg | TiO₂ Polymorph |
|---|---|---|---|---|---|---|
| Example 1 | 100 | 4000 | Anatase | 60 | 40 | Anatase |
| Example 2 | 334 | 1100 | Anatase | 70 | <30 | Anatase |
| Example 3 | 329 | >1000 | Anatase | 77 | <30 | Anatase |
| Example 4 | 302 | 3300 | Anatase | 52 | <30 | Anatase |
| Comparative Example 1 | 321 | 4700 | Anatase | 3 | <30 | Rutile |
| Comparative Example 2 | 351 | 2000 | Anatase | 3 | <30 | Rutile |

TABLE 2

Analysis Overview of Support Materials used for FTS

| | BET m²/g | S mg/kg | TiO₂ Polymorph |
|---|---|---|---|
| Example 2 (after 1 h 1000° C.) | 70 | <30 | Anatase |
| Example 3 (after 1 h 1000° C.) | 77 | <30 | Anatase |
| Example 4 (after 1 h 1000° C.) | 52 | <30 | Anatase |
| Comparative Example 3 | 105 | 70 | Rutile |
| Comparative Example 4 | 55 | <30 | Anatase/Rutile |
| Comparative Example 5 | 359 | <30 | Anatase |

TABLE 3

Fischer Tropsch Synthesis Data of Inventive and Comparative Examples

| | $X_{CO}$% | $S_{CH_4}$% | $P_{C_{5+}}g_{C_{5+}}/(g_{C_o}h)$ | $S_{CO_2}$% |
|---|---|---|---|---|
| Example 2 | 54 | 7.2 | 3.46 | 0.6 |
| Example 3 | 55.2 | 7.8 | 3.35 | 0.7 |
| Example 4 | 52.9 | 7.7 | 3.3 | 0.6 |
| Comparative Example 3 | 12.6 | 9.4 | 0.74 | n.d. |
| Comparative Example 4 | 20.6 | 9.5 | 1.18 | n.d. |
| Comparative Example 5 | 0.5 | 31.3 | 0.02 | n.d. | n.d. = not determined because CO conversion was too low.*

The above results of the Examples according to the present invention and of the Comparative Examples as well as the catalytic tests demonstrate that the combination of the properties of the inventive materials, i.e., high specific surface area, anatase content and low sulfur content, lead to superior catalytic properties. Reference should also be had to the appended claims.

What is claimed is:

1. An anatase titanium dioxide comprising:
    a content of SiO₂ in an amount of 2-30% b.w., calculated as an oxide;
    a sulfur content of less than 80 ppm based on a total weight of oxides; and
    a BET of 50-77 m²/g,
    wherein,
    at least 95% of the titanium dioxide is present as anatase titanium dioxide.

2. The anatase titanium dioxide as recited in claim 1, further comprising:
    at least one compound selected from oxides of Al and Zr in an amount of up to 48% b.w., calculated as oxides, of a total weight of the oxides,
    wherein,
    a total amount of the at least one compound selected from oxides of Al and Zr, calculated as oxides, and the content of SiO₂, calculated as an oxide, is 2-50% b.w.

3. A catalyst comprising the anatase titanium dioxide as recited in claim 1.

4. A catalyst support comprising the anatase titanium dioxide as recited in claim 1.

5. The anatase titanium dioxide as recited in claim 2, wherein the sulfur content is less than 30 ppm based on the total weight of the oxides.

\* \* \* \* \*